V. O. HINTON.
HORSE SHADING ATTACHMENT FOR VEHICLES.
APPLICATION FILED JUNE 28, 1920.

1,378,031.

Patented May 17, 1921.
2 SHEETS—SHEET 1.

Witness:
R. Hamilton

Inventor;
V. O. HINTON
By Thorpe & Gerard
Attys

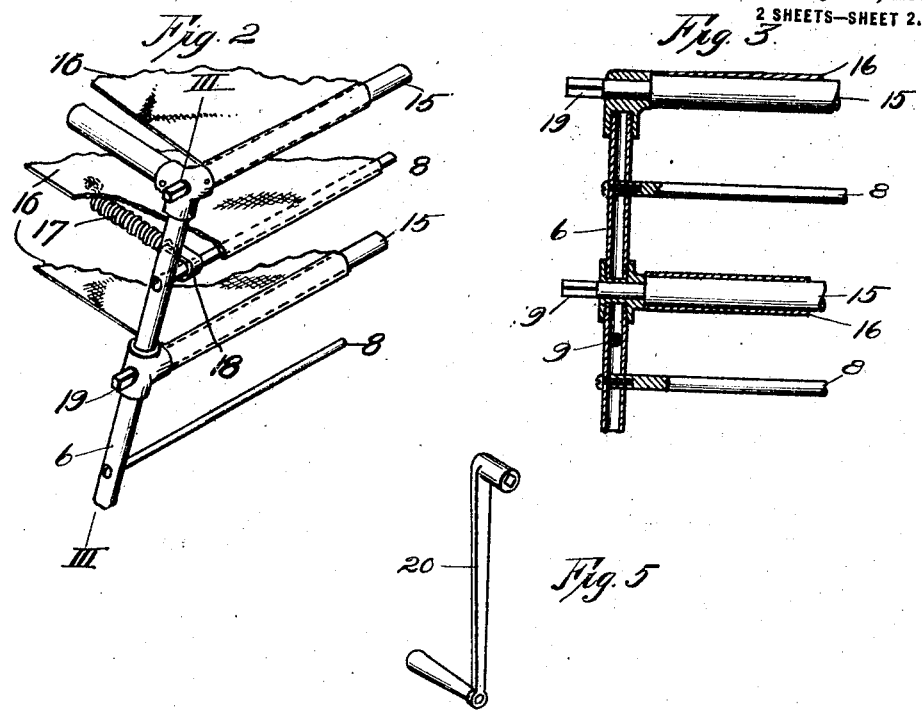
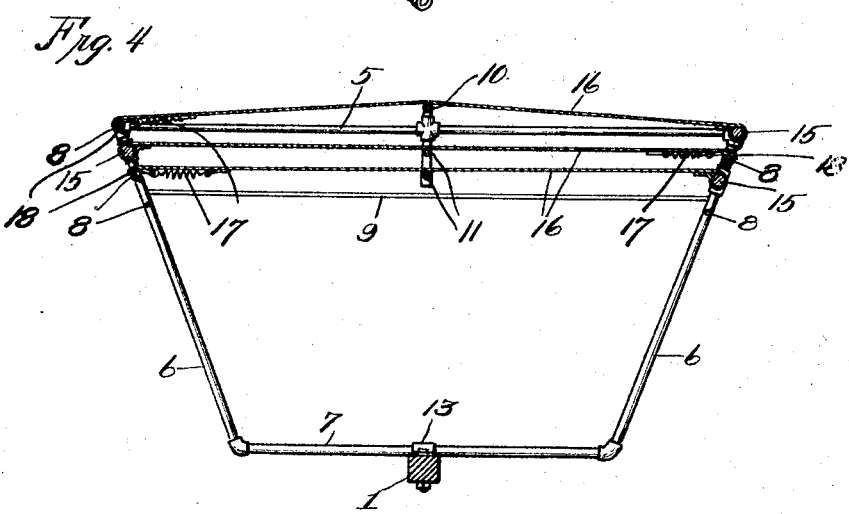

UNITED STATES PATENT OFFICE.

VACHEL O. HINTON, OF KANSAS CITY, KANSAS.

HORSE-SHADING ATTACHMENT FOR VEHICLES.

1,378,031.  Specification of Letters Patent.  Patented May 17, 1921.

Application filed June 28, 1920. Serial No. 392,281.

*To all whom it may concern:*

Be it known that I, VACHEL O. HINTON, a citizen of the United States, and resident of Kansas City, in the county of Wyandotte, State of Kansas, have invented a certain new and useful Improvement in Horse-Shading Attachments for Vehicles, of which the following is a complete specification.

This invention relates to horse shading attachments for headers, binders and the like and has for its object to produce a device which, on a machine or vehicle propelled by horses, will protect such animals from the heat of the sun without burdening them with its weight or touching them.

A further object is to produce a device of the character mentioned which can be expeditiously secured in or removed from operative position, and which can be protected from the whipping effect of the wind and from the dews of the night to a large extent, by winding the fabric portion of the device in compact rolls.

It is very desirable to protect animals from the direct rays of the sun in the hot season of the year, not only from the humanitarian standpoint, but from the loss of time which occurs each time the crew cease operations for the purpose of breathing the horses. In very hot weather and in heavy work, this must be done about every thirty minutes, and it is necessary usually to rest horses from ten to thirty minutes, disregard of these rest periods seriously endangering the lives of the animals.

With the objects therefore in view as above set forth, the invention consists in certain and useful features of construction and combinations of parts as hereinafter described and claimed; and in order that it may be fully understood reference is to be had to the accompanying drawings, in which:

Fig. 2 is an enlarged fragmentary perspective view of the attachment.

Fig. 3 is a section on the line III—III of Fig. 2.

Fig. 4 is a vertical cross section of the attachment, and also shows the tongue of a vehicle as an underlying support.

Fig. 5 is a perspective view of a crank for use in winding the fabric into rolls.

Figure 1:
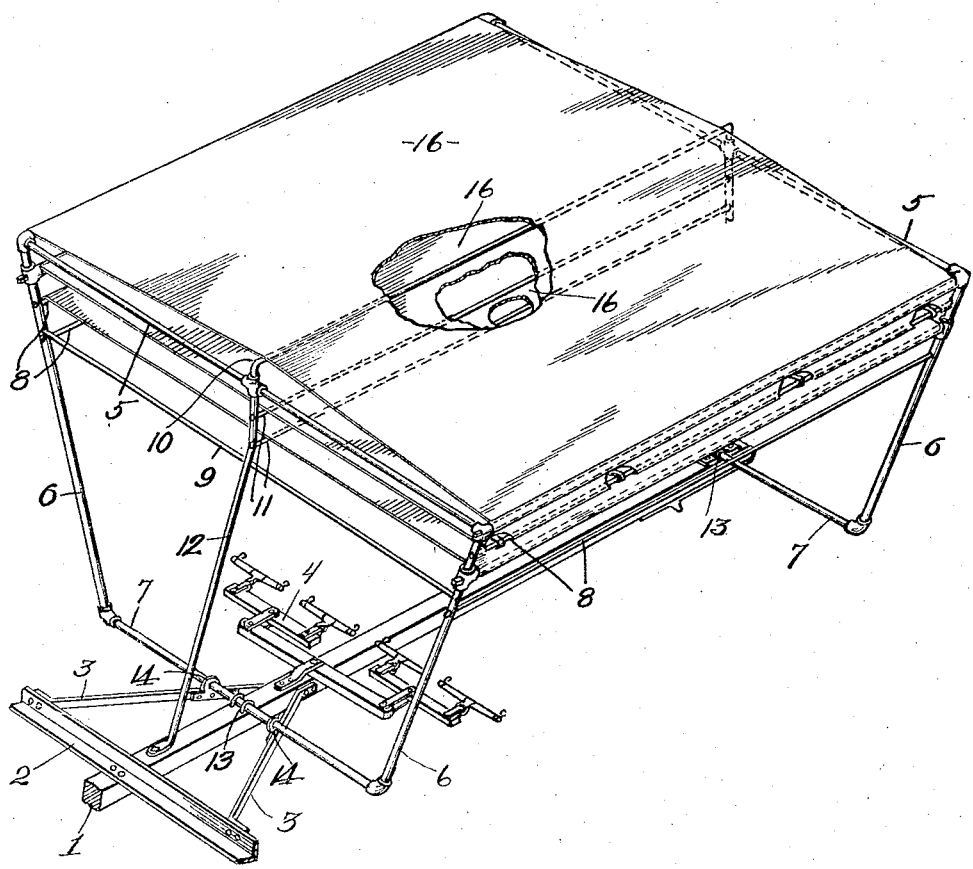
Figure 1 is a perspective view of a shading attachment mounted in operative position upon the tongue of a vehicle.

Referring now to the drawing in detail, 1 indicates the tongue, 2 a part of the frame, 3 braces between the frame and the tongue, and 4 draft rigging mounted on the tongue, to which the draft horses are adapted to be hitched.

The attachment for shading the animals is constructed as follows: 5, 6 and 7 constitute the ends of a skeleton frame, the side portions of said frame being connected by longitudinal tie rods 8, which rods at opposite sides occupy alternating planes, and the rear end frame is bridged by a cross rod 9 as a support for the driving reins, not shown.

The top bars 5 of the end frames are connected by an arched rod 10, the top of said rod standing in a plane higher than the said frame for a purpose which is hereinafter explained, and the ends of said arched rod are connected by longitudinal braces 11. One end of the arch rod is provided with a downwardly and rearwardly extending arm 12 fastened at its lower end to the tongue 1 or any other fixed point of the machine, this arm serving to guard against forward or rearward collapsing action of the skeleton frame as a whole. The said frame stands upon the tongue and is fastened thereto in any suitable manner preferably by clips 13. The rear end frame also may be fastened to brackets 14 carried by braces 3, these connections serving to assist in preventing twisting movements of the frame as a whole under vibratory movement or sway of the tongue when the vehicle is in motion.

Connecting the sides of the end frame in planes alternating with those of the rods 8 and extending parallel with the latter, are rollers 15, there being preferably two of said rollers at one side of the frame and one at the other, and fastened to each of said rollers is a fabric shade 16, the shades being of sufficient length to extend from one side of the skeleton frame to the other, and attached to the free ends of said shades are retractive springs 17 terminating in hooks 18. The hooks are adapted to be engaged with the rods 8. It is possible therefore to unroll a shade and draw it across the frame and hook it to the rod at the opposite side of the frame in the same horizontal plane as the roll, the topmost shade being extended over the arched rod 10 so that it shall tend to shed water toward both sides in the event of a heavy rainfall upon it.

When the device is in operative condition as indicated in Fig. 1, it will be apparent that the horses are shaded and that they are even further protected through the interposition between them and the sun of a plurality of the shades as the shadow cast by a plurality of shades is denser than by a single shade, and air circulates between the shades and thus leaves it cooler below them than it would otherwise be, especially when the vehicle is in motion. The rear ends of the rollers are diametrically reduced and terminate in squared shanks 19 for engagement by the correspondingly shaped socket of a hand wrench 20, which preferably is detachable so that it can be used for each of the rollers.

From the above description it will be apparent that I have produced a horse-shading attachment for vehicles which embodies the features of advantage set forth as desirable in the statement of the object of the invention, and which obviously may be modified in minor particulars without departing from the principle and scope of the constructions set forth by the appended claims.

I claim:

1. The horse-shading attachment for vehicles comprising a skeleton frame mounted upon the tongue of the vehicle and comprising two upright end frames connected together and a plurality of superposed shades stretched across the top of said frame and fixed at one side to the latter and detachably connected to it at the other side.

2. The horse-shading attachment for vehicles comprising a skeleton frame mounted upon the tongue of the vehicle and comprising two upright end frames connected together and a plurality of superposed shades stretched across the top of said frame and fixed at one side to the latter and detachably connected to it at the other side, and a rod extending longitudinally of said frame and projecting to a higher plane than the same and engaging the under side of the topmost shade to cause the same to incline from said rod downwardly and outwardly toward each side of said frame.

3. The horse-shading attachment for vehicles comprising a skeleton frame mounted upon the tongue of the vehicle and comprising two upright end frames connected together and a plurality of superposed shades stretched across the top of said frame and fixed at one side to the latter and detachably connected to it at the other side, and rollers for winding up said shades.

4. The combination with a vehicle having a tongue of a frame fastened upon said tongue and comprising a rear end frame, a front end frame, longitudinal rods connecting the respective sides of said frames together, means to brace the frame against collapse, longitudinally extending rollers at the sides of said frame in different horizontal planes, rods extending longitudinally of the frame, and flexible superposed shades secured to said rollers and adapted for detachable engagement with the rods at the opposite side of the frame from their respective rollers.

5. The combination with a vehicle having a tongue, of a frame fastened upon said tongue and comprising a rear end frame, a front end frame, longitudinal rods connecting the respective sides of said frames together, means to brace the frame against collapse, longitudinally extending rollers at the sides of said frame in different horizontal planes, rods extending longitudinally of the frame, and flexible superposed shades secured to said rollers and adapted for detachable engagement with the rods at the opposite side of the frame from their respective rollers, the said shades having retractive springs attached to their free ends and equipped with hooks for engaging the said rods.

In testimony whereof I hereunto affix my signature.

VACHEL O. HINTON.